United States Patent [19]

Sellers

[11] Patent Number: 5,335,005
[45] Date of Patent: Aug. 2, 1994

[54] EXPANDED AREA PRINTING METHODS AND ASSOCIATED APPARATUS FOR AN IMAGE REPRODUCTION MACHINE

[75] Inventor: Charles A. Sellers, Houston, Tex.

[73] Assignee: Compaq Computer Corporation, Houston, Tex.

[21] Appl. No.: 851,848

[22] Filed: Mar. 16, 1992

[51] Int. Cl.⁵ .................... G01D 15/04; G03G 21/00
[52] U.S. Cl. ..................... 346/160; 355/318; 355/319; 355/320; 347/101
[58] Field of Search .............. 355/318, 319, 320; 346/1.1, 108, 160

[56] References Cited

U.S. PATENT DOCUMENTS

| | | | |
|---|---|---|---|
| 4,702,589 | 10/1987 | Ito | 355/319 |
| 4,771,319 | 9/1988 | Hamakawa | 355/319 |
| 4,825,250 | 4/1989 | Miyata et al. | 355/319 X |
| 4,924,275 | 5/1990 | Nelson | 355/319 |
| 4,970,661 | 11/1990 | Tsuzuki et al. | 364/519 |
| 5,159,390 | 10/1992 | Imaizumi | 355/318 X |
| 5,208,902 | 5/1993 | Kumon | 395/116 |
| 5,257,035 | 10/1993 | Funahashi et al. | 346/1.1 |

*Primary Examiner*—Benjamin R. Fuller
*Assistant Examiner*—Randy W. Gibson
*Attorney, Agent, or Firm*—Konneker Bush Hitt & Chwang

[57] ABSTRACT

A laser printer is provided with the ability to receive and sequentially print portions of an image substantially larger than the cut paper sheet size or sizes the printer is ordinarily configured to handle. The outsized image to be printed is input to the printer controller and stored in its memory. An oversized cut paper sheet is then folded in half and placed in the printer's manual feed area with the folded side edge of the sheet against an alignment guide and the doubled front edge of the sheet against the edge sensor portion of the printer. The printer's "PRINT" button is then pressed. Via operation of the printer controller microprocessor, a first signal representative of half the stored image is responsively output to the printer's laser generator, thereby imprinting the image half on the underside of the folded sheet. After it exits the printer, the operator flips the folded sheet over, operatively re-inserts it into the manual feed area against the alignment guide, and presses the print button again. This time the printer controller outputs a second signal representative of the balance of the stored image to the laser generator, thereby imprinting the balance of the image on the underside of the sheet as it traverses the printer. In this manner, for example, a printer having only 8.5" printing and paper feed widths may be used to print on an 11×17" sheet an image scaled to essentially fill the sheet.

15 Claims, 3 Drawing Sheets

EXPANDED AREA PRINTING METHODS AND ASSOCIATED APPARATUS FOR AN IMAGE REPRODUCTION MACHINE

BACKGROUND OF THE INVENTION

1. Field of the Invention

The present invention relates generally to image reproduction apparatus, such as printers and copiers, and more particularly relates to paper feed and image imprinting control aspects of such apparatus.

2. Description of Related Art

The formation and subsequent printing of large scale images, such as engineering drawings, has been considerably facilitated in recent years with the advent of CAD (computer assisted drawing) software that may be loaded on a personal computer and used to rapidly form complex on-screen images that may be stored in the computer memory and later transmitted for printout to an image reproduction machine such as a computer controlled plotter that reproduces the computer generated image or images on a large paper sheet.

While the use of plotters can rather rapidly produce highly accurate, enlarged scale reproductions of a computer generated image, plotters tend to be relatively large, mechanically complex and expensive and thus unsuitable in many drawing reproduction applications in which space and budgetary constraints must be met. Of course, plotters are not the only apparatus capable of reproducing computer generated images of the complexity of engineering drawings. A variety of smaller and less expensive personal printing devices, such as the increasingly popular laser printer, are readily available for this use.

However, a scale problem often exists when a conventional laser printer, or another type of image reproduction machine utilizing cut paper sheets, is used in this application. This is due to the fact that many personal laser printers are only dimensioned to handle 8.5"×11" (letter size) and 8.5"×14" (legal size) cut paper sheets. While CAD programs are typically provided with the capability of downscaling an engineering drawing to a printout size that will fit within either of these "correspondence" sheet sizes, many engineering drawings are relatively complex with many connected and overlapping parts. Accordingly, if they are downsized to fit within the boundaries of an 8.5"×11" or 8.5"×14" sheet of paper, they may well be too small to be easily read.

It can be readily seen from the foregoing that it would be desirable to provide methods and associated apparatus that would permit an image reproduction machine, such as a laser printer, to print out on an oversized cut paper sheet an image substantially larger than that which can be accommodated by a cut paper sheet that the machine is nominally configured to handle and imprint. It is accordingly an object of the present invention to provide such methods and associated apparatus.

SUMMARY OF THE INVENTION

In carrying out principles of the present invention, in accordance with a preferred embodiment thereof, an image reproduction machine, illustratively in the form of a laser printer, is provided with the ability to receive and sequentially print portions of an image substantially larger than the nominal cut paper sheet size or sizes the machine is ordinarily configured to handle. Using a method of the present invention, this permits the machine to print out, on an oversized cut paper sheet, an image of substantially greater size than that which could be accommodated by the machine's nominal sheet size or sizes.

The machine preferably comprises a housing and paper feed means operative to receive a first cut paper sheet of a nominal, unfolded size to be imprinted by the machine, feed the received sheet through the housing, and then discharge the sheet from the housing. The paper feed means are also operative to receive, through-feed and discharge from the housing an oversized cut paper sheet in a folded orientation in which the oversized sheet has a front end edge portion, a rear end edge portion, a side fold edge portion, and opposite first and second outer side surface portions. In an unfolded orientation thereof, the oversized sheet is substantially larger than the aforementioned first cut paper sheet that the machine is nominally sized to handle.

Memory means are provided for receiving and storing an oversized image of a printout size greater than that which could be accommodated by the first cut paper sheet, and image transfer means are provided for imprinting the stored oversized image on the folded oversized sheet. The image transfer means include first means, responsive to a first print input signal transmitted to the machine, for imprinting a first portion of the stored oversized image on the first outer sheet side surface portion as the folded oversized sheet is moved, front end edge portion first, through the housing by the paper feed means; and second means, responsive to a second print input signal subsequently transmitted to the machine, for imprinting a second portion of the stored oversized image on the second outer sheet side surface portion as the folded oversized sheet is moved, rear end edge portion first, through the housing by the paper feed means.

Using a method of the present invention in conjunction with the image reproduction described above, an operator transmits an oversized image to the machine for storage in an internal memory portion thereof. The folded oversized sheet is operatively inserted in the machine, front end edge portion first, and the operator transmits the aforementioned first print input signal to the machine, thereby causing it to feed the folded sheet through the machine housing while concurrently imprinting the first oversized image portion on the first outer side surface portion of the folded sheet.

When the folded oversized sheet is discharged from the housing, the operator flips the folded sheet end-for-end, inserts the flipped sheet rear end edge portion first into the machine and transmits the aforementioned second print input signal to the machine. This causes the machine to feed the folded sheet through the housing while concurrently imprinting the second oversized image portion on the second outer side surface portion of the flipped folded sheet. By positioning the folded side edge portion of the folded sheet against a paper guide portion of the machine each time the folded sheet is fed therethrough, a relatively precise alignment may be achieved between the sequentially imprinted oversized image portions on the unfolded oversized sheet.

As an example of the benefits of this method, an image that substantially fills an 11"×17" cut paper sheet may be imprinted on such sheet using a laser printer having only 8.5" printing and paper feed widths. This result can be accomplished by folding the oversized sheet in half, to an 8.5"×11" folded configuration. The folded sheet is then twice fed through the printer, in a direction parallel to its long side, as described above. On each feedthrough, a different half of a stored oversized image is imprinted on the sheet.

DETAILED DESCRIPTION

Figure 1:
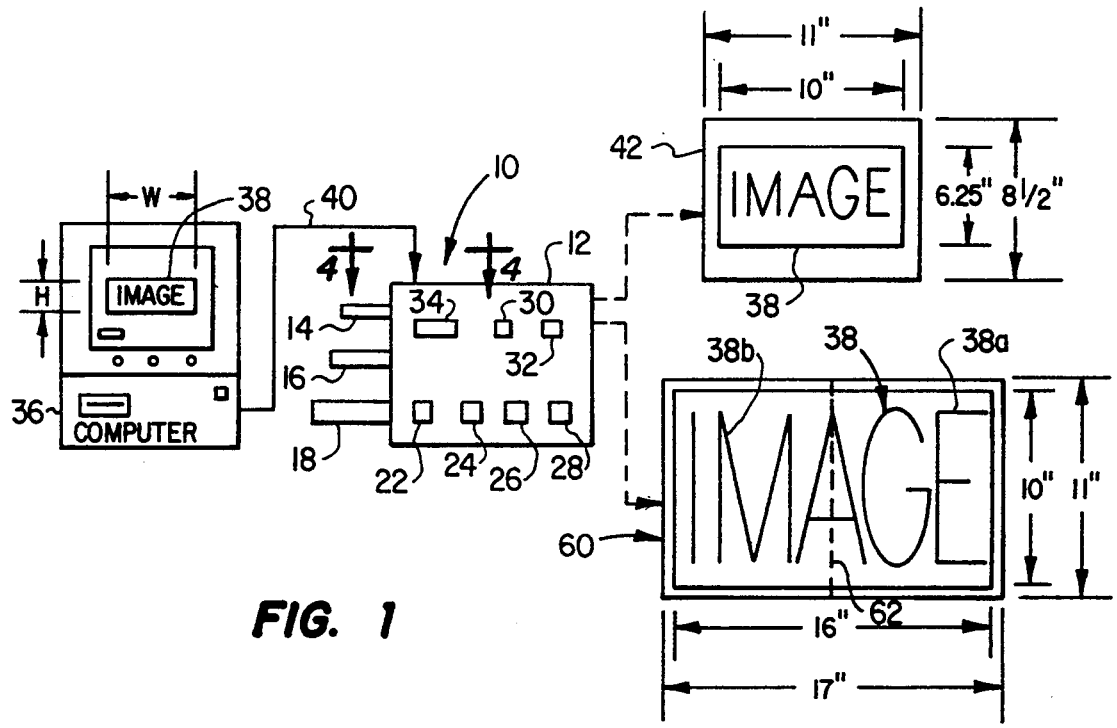
FIG. 1 is a schematic diagram illustrating an image reproduction machine, representatively in the form of a laser printer, that embodies principles of the present invention and is uniquely provided with expanded area printing capabilities.

Schematically depicted in FIG. 1 is an image reproduction machine, representatively in the form of a laser printer 10, that embodies principles of the present invention. Printer 10 includes a housing 12 that operatively supports three cut paper sheet input structures—a manual feed platform 14, an 8.5"×11" paper tray 16, and an 8.5"×14" paper tray. These three paper input structures form a part of the printer's overall paper feed means which include the usual paper feed mechanism 20 (FIG. 2) positioned within the housing.

Mounted exteriorly on the housing 12 are various operating controls including a "PRINT" button 22; feed source selector buttons 24,26,28 that may be pressed to respectively select the paper in input areas 14,16,18 for driven movement through housing 12, and subsequent discharge therefrom, by the paper feed mechanism 20; a "regular" print mode selector button 30; an "oversize" print mode selector button 32; and a scale indicator display 34.

The printer 10 is shown representatively connected to a personal computer 36 in which a conventional computer assisted drawing (CAD) program is loaded and usable to form on the computer monitor screen an image 38—for example, an engineering drawing—having representative on-screen height and width dimensions H and W. Computer 36 is operative to output an image signal 40 to the printer 10 for use by the printer, as subsequently described, in imprinting the image 38 on a cut paper sheet 42 fed through the printer in response to pressing the "PRINT" button 22.

For purposes of discussion, it will be assumed that the sheet 42 is an 8.5"×11" sheet which has been fed through the housing 12 from the manual feed platform 14, and that a minimum 0.5" printing margin has been maintained on the sheet. It will be further assumed that the image 38 has a width-to-height ratio such that when it is scaled up to the maximum printout size which the sheet 42 can accommodate within its predetermined 0.5" margins, the scaled up image 38 ultimately imprinted on the sheet 42 has a 10" width, and a 6.25" height, as depicted in FIG. 1.

Figure 4:
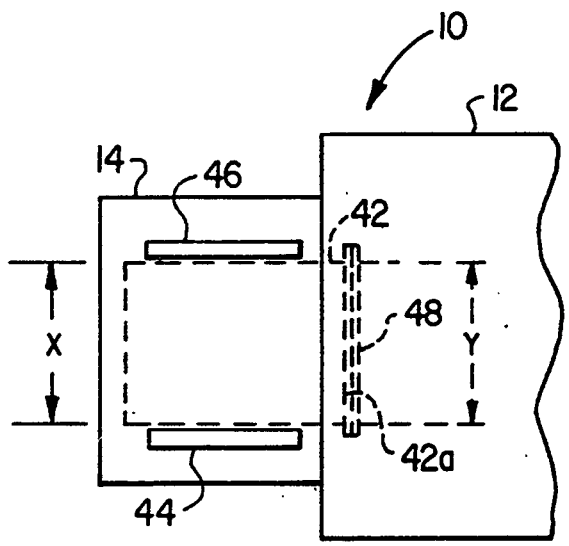
FIG. 4 is an enlarged scale, simplified top plan view of a portion of the printer taken generally along line 4—4 of FIG. 1.

In using the laser printer 10 to print the image 38 on the sheet 42, the operator places the sheet 42 lengthwise between a pair of side edge alignment guide members 44 and 46 disposed on the top side of the manual feed platform 14 (FIG. 4), with the front end edge 42a of the sheet against the printer's internal paper edge sensor 48. Alternatively, of course, the sheet 42 could be fed from the paper tray 16 (FIG. 1) if desired, the tray 16 (like the tray 18) having built-in side edge alignment guides similar to the guides 44,46 illustrated in FIG. 4. As shown in FIG. 4, the printer 10 representatively has 8.5" maximum paper feed and printing widths X and Y measured in a direction transverse to the paper throughfeed direction.

Figure 2:
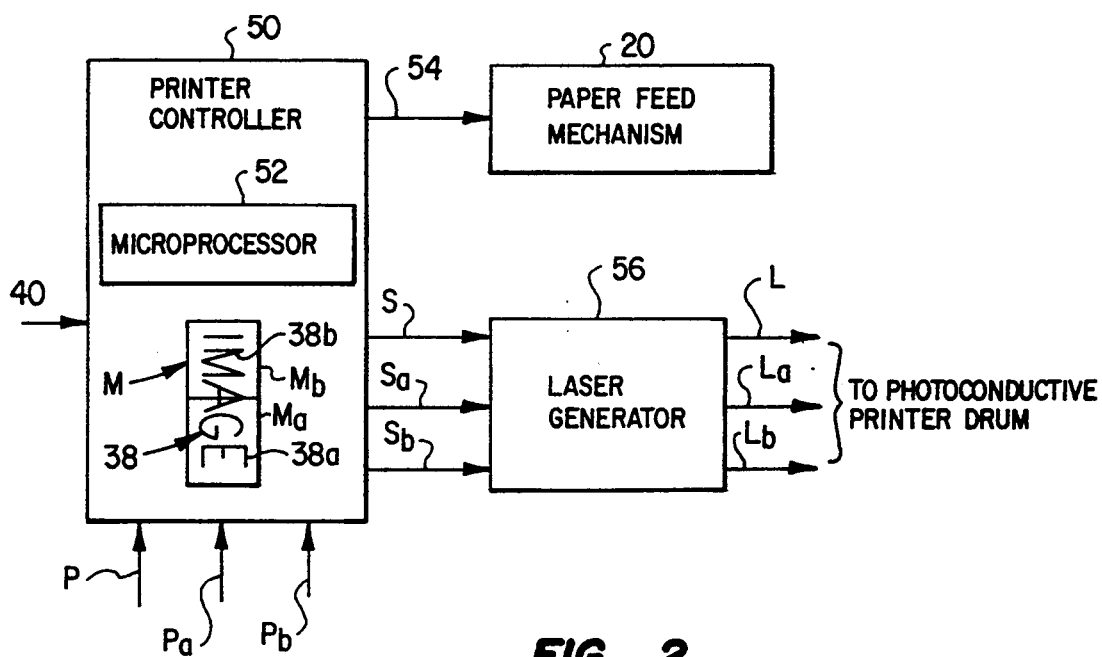
FIG. 2 is a schematic control diagram illustrating the operation of a controller portion of the printer.

Either before or after the sheet 42 is positioned in this manner for manual feed through and subsequent discharge from the housing 12, the image signal 40 is transmitted to a controller portion 50 of the printer (FIG. 2). Under the control of a microprocessor 52, the printer controller 50 uses the signal 40 to store the transmitted image 38 in a memory portion M of the printer. To operatively feed the positioned 8.5"×11" sheet 42 through the housing 12, the operator pushes the "regular" print mode button 30, the manual feed source button 24, and an 8.5"×11" paper size selection button (not shown). If the computer-selected image scale is too large to be accommodated on the selected nominal sheet size, an appropriate "selected scale too large" message is microprocessor generated on the scale display to permit the operator to reduce the image printout size using the computer 36.

Finally, the operator depresses the "PRINT" button 22, thereby transmitting a print input signal P to the printer controller 50 as schematically depicted in FIG. 2. Upon receipt of signal P, the microprocessor 52 causes the printer controller 50 to output a start signal 54 to the paper feed mechanism 20, and output a start signal S to the printer's laser generator 56. Receipt of the signal S causes the laser generator 56 to beam an image representative laser L onto the printer's rotating photoconductive drum (not shown). In turn, toner is transferred from the drum to the sheet 42, as the sheet is fed through the housing 12 by the paper feed mechanism 20, to form the image 38 on the sheet 42 as shown in FIG. 1.

With respect to the feeding and imprinting aspects of the printer 10 just described in conjunction with one of the cut paper sheet sizes it is nominally configured to handle, the operation of the printer is conventional. However, utilizing principles of the present invention, the printer 10 is also uniquely capable of imprinting the image 38 on an oversized cut paper sheet 60 (FIG. 1) larger than the sheet sizes the printer is nominally configured to handle, and at an oversized printout scale substantially larger than that which could be accommodated by either of the printer's 8.5"×11" and 8.5"×14" nominal sheet sizes.

For purposes of illustration, it will be assumed that the sheet 60 is 17" long by 11" wide (a standard size). In a manner subsequently described, the image 38 may be imprinted on sheet 60 at an oversized scale such that the imprinted image is approximately 10" high by approximately 16" wide, thereby essentially filling the sheet area within its 0.5" peripheral borders.

To carry out this unique expanded area printing technique, the following representative method is utilized.

Figure 5:
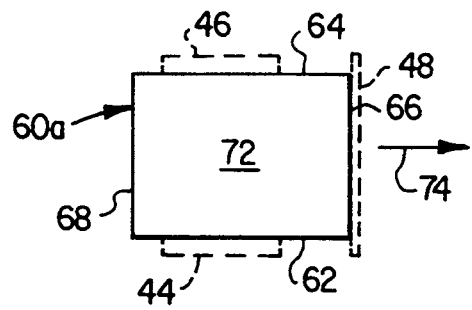
FIGS. 5 and 6 are schematic top plane views of a folded, oversized cut paper sheet being fed through the printer.

Referring to FIGS. 2 and 5, the operator selects an expanded or oversized printing mode of printer 10 by pressing the button 32, and also presses the feed source selector button 24. The printout scale of the on-screen image 38 is increased to a magnitude that will cause the ultimately printed image to essentially fill the oversized sheet 42 as representatively illustrated in FIG. 1, and the image signal 40 is transmitted to the printer controller 50. Under control of the microprocessor 52, one half 38a of the transmitted image 38 is stored in memory portion Ma, and the other half 38b of the transmitted image is stored in memory portion Mb. If the selected printout scale is too large for the oversized sheet 60, an appropriate cautionary message is automatically generated in the scale display 34 to permit the operator, as schematically indicated in the FIG. 3 flow diagram, to adjust the printout scale before the actual printing is carried out.

With the printer thus readied for its expanded area printing task, the operator folds the oversized sheet 60 in half lengthwise to form a folded sheet 60a having a side fold edge portion 62; an opposite, doubled free side edge portion 64 (defined by what were the opposite ends of the nonfolded sheet 60); a doubled front end edge portion 66; a doubled rear end edge portion 68; a first outer side surface portion 70 (FIG. 6); and an oppositely facing second outer side surface portion 72.

Figure 3:
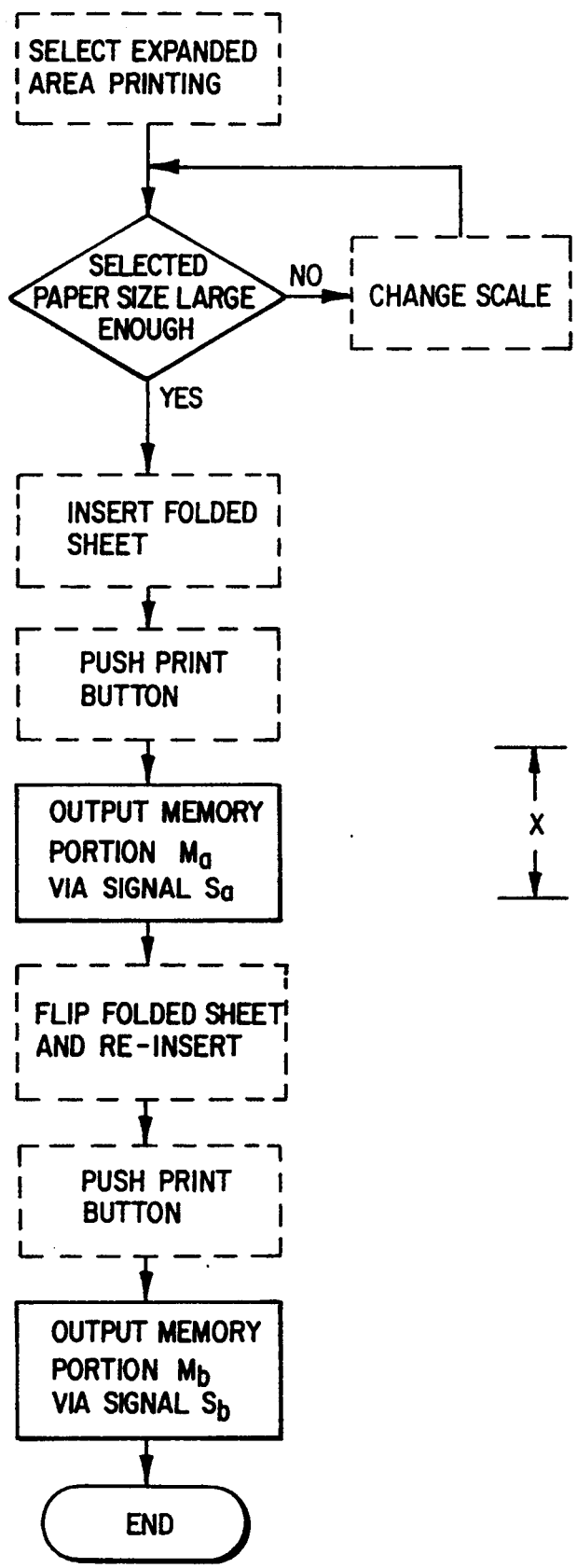
FIG. 3 is a flow chart representatively illustrating the operation of the printer, with the operator activity being shown in phantom, and a portion of the programmed, microprocessor-controlled operation of the printer being shown in solid lines.

The folded sheet 60a is positioned on the manual feed platform 14, with the side fold edge portion 62 positioned against the alignment guide member 44, and the front end edge portion 66 positioned against the edge sensor 66, as shown in FIG. 5. Next, as indicated in FIG. 3, the operator pushes the "PRINT" button 22 to transmit to the printer controller 50 a first print input signal Pa (FIG. 2). Under the control of the microprocessor 52, the paper feed start signal 54 is transmitted to the paper feed mechanism 20.

Figure 5A:
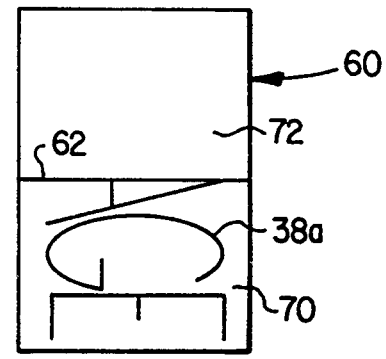
FIGS. 5A and 6A are top plan views of the sheet respectively unfolded from its FIG. 5 and FIG. 6 positions.

Additionally, a start signal Sa is transmitted to the laser generator 56, the signal Sa being representative of the stored image half 38a. In response to its receipt of the signal Sa, the laser generator 56 causes a corresponding laser La to be beamed onto the rotating photoconductive printer drum, thereby imprinting the oversized image half 38a on the outer side surface portion 70 of the folded sheet 60a as it is driven forwardly through the housing 12 as indicated by the arrow 74 in FIG. 5. For purposes of illustration, FIG. 5A shows the folded sheet as being unfolded after its discharge from the printer housing. It can be seen in this figure that a top end of the oversized image half 38a is bounded by the sheet fold 62.

Figure 6:
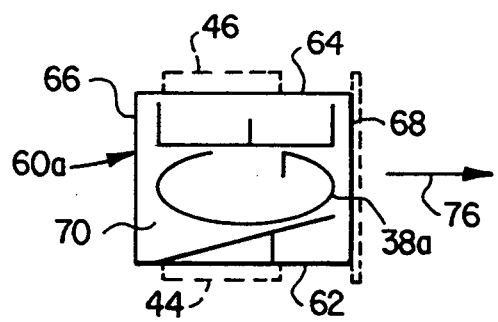

Referring now to FIGS. 2, 3 and 6, after the folded sheet 60a is discharged from the housing, the operator grasps the folded sheet, flips it end-for-end relative to its FIG. 5 orientation, and re-inserts the flipped folded sheet 60a between the alignment guides 44,46 with the side fold edge portion 62 against the guide 44, and the rear end edge portion 68 against the edge sensor 48, as shown in FIG. 6.

Figure 6A:
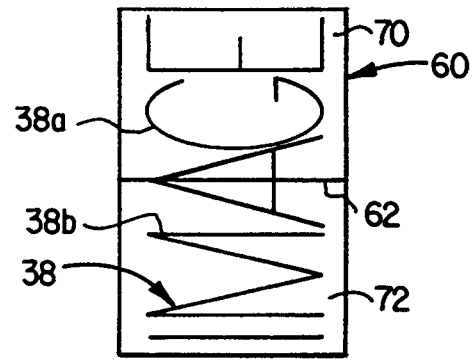

With the flipped folded sheet 60a operatively positioned in this manner on the manual feed platform 14, the operator pushes the "PRINT" button 22 again (see FIG. 3) to transmit a second print input signal Pb to the printer controller 50. In response, the printer controller again transmits the start signal 54 to the paper feed mechanism 20, and also transmits a start signal Sb to the laser generator 56. Signal Sb is representative of the remaining stored oversized image half 38b, and causes the laser generator to beam a corresponding laser Lb onto the rotating photoconductive printer drum to thereby imprint the remaining oversized image half 38b onto the outer side surface portion 72 of the folded sheet 60a as it is this time rearwardly driven through the printer housing by the paper feed mechanism as indicated by the arrow 76 in FIG. 6. Upon its second discharge from the printer housing, the folded sheet 60a may be unfolded (as shown in FIG. 6A) to display the entire oversized image 38 imprinted thereon and substantially filling the sheet side area within the predetermined border area. As shown, the oversized halves 38a, 38b meet at and are aligned along the fold line 62.

In this unique manner the present invention permits the imprintation of an image on a cut paper sheet substantially larger than the sheet sizes the printer 10 is nominally configured to handle, and at a printout scale substantially larger than could be accommodated by either of such nominal sheet sizes. Importantly, this result is achieved without in any manner increasing the physical size of the printer housing, the size of its photoconductive drum, or the size of either its paper handling feed width or its printing width. All that is necessary is the above described manual manipulation of an oversized cut paper sheet and an appropriate modification of the internal printer software to provide for the expanded area printing control steps previously discussed in detail herein.

While the expanded area printing method of the present has been described using an 11"×17" oversized sheet, it will be appreciated that other oversized sheets could be used if desired. For example if the printer had 11" printing and paper feed widths, a 22" through the printer 11" end first.

Additionally, although the printing method has been representatively described as including the step of folding the oversized sheet in half, and imprinting halves of an outsized image on its opposite outer side surfaces, it will be appreciated that an oversized sheet could be folded more than once, and various lesser portions of an overall stored image imprinted on various side sections of the folded sheet.

Moreover, while the printing method has been representatively described as including the steps of flipping the folded sheet end-for-end after its initial discharge from the printer, and then re-feeding the folded sheet in its flipped orientation through the printer, it will be readily appreciated that the folded sheet could also be flipped in a side-to-side manner (so that it would then be re-fed front end edge first through the printer) if desired.

Finally, the illustrated combination of a personal computer and a laser printer may be used to good advantage in carrying out the expanded area printing method of the present invention. However, other apparatus could be used to transmit the image signal to the image reproduction machine, and a suitable image reproduction machine other than a laser printer could be used if desired.

The foregoing detailed description is to be clearly understood as being given by way of illustration and example only, the spirit and scope of the present invention being limited solely by the appended claims.

What is claimed is:

1. A method for use in conjunction with an image reproduction machine operative and dimensionally configured to receive, throughfeed and then discharge a first, nonfolded cut paper sheet having a nominal size and imprint thereon, within boundaries of a side surface thereof, an image transmitted to said machine, said method being useable to imprint on an oversized cut paper sheet having a size substantially larger than said nominal size, an oversized image of a printout size greater than that which could be accommodated by said first sheet, said method comprising the steps of:

transmitting said oversized image to said machine;

folding said oversized sheet to form therefrom a folded sheet having a front end edge portion, a rear end portion, a side fold edge portion, and first outer side surface and second outer side surfaces opposite said first outer side surface;

feeding said folded sheet, front end portion first, through said machine and concurrently causing said machine to imprint a first portion of the received oversized image upon said first outer side surface of said folded sheet; and refeeding said folded sheet, in a flipped orientation, through said machine and concurrently causing said machine to imprint a second portion of the received oversized image upon said second outer side surface of said folded sheet.

2. The method of claim 1 wherein:
said transmitting step is performed using a computer assisted drawing program loaded on a computer operatively connected to said image reproduction image.

3. The method of claim 1 wherein:
said transmitting step is performed by transmitting said oversized image to a laser printer.

4. The method of claim 1 wherein:
said folding step is performed by folding said oversized sheet in half,
said step of concurrently causing said machine to imprint a first portion of the received oversized image is operative to imprint half of the received oversized image upon said first outer side surface of said folded sheet, and
said step of concurrently causing said machine to imprint a second portion of the received oversized image is operative to imprint the remaining half of the received oversized image upon said second outer side surface of said folded sheet.

5. The method of claim 1 wherein:
said feeding and refeeding steps are performed by manually feeding and refeeding said folded sheet through said machine.

6. The method of claim 1 wherein said step of causing said machine to imprint first and second portions of the received oversized image on said folded sheet includes the steps of:
storing the transmitted oversized image in a memory portion of said machine, and
outputting sequential first and second control signals, respectively representative of first and second portions of the image stored in said memory portion, to a printing portion of said machine respectively in response to first and second successive print input signals transmitted to said machine.

7. A method for use in conjunction with an image reproduction machine having memory means for receiving and storing an image; paper feed means, including a paper input area having a paper side edge alignment member, for receiving a cut paper sheet to be imprinted, operatively feeding the received sheet through the machine, and then discharging the sheet from said machine; and image transfer means operable to imprint the stored image on a side surface of the sheet as the sheet is fed through said machine, said method being useable to imprint on an oversized cut paper sheet larger than a normal sheet size the machine is nominally configured to handle, an oversized image of a printout size greater than that which could be accommodated by said normal sheet size, said method comprising the steps of:

storing said oversized image in said memory means;

folding said oversized sheet to form a folded sheet having a front end edge portion, a rear end portion, a side fold edge portion extending between said front end portion and rear end edge portion, and first outer side surface and second outer side surface opposite said first outer side surface;

positioning said folded sheet, front end edge portion first, in said paper input area with said side fold edge portion against said alignment guide member;

operating said paper feed means to feed said folded sheet through, and then discharge said sheet from, said machine;

operating said image transfer means to imprint a first portion of the stored oversized image upon said first outer side surface of said folded sheet as said folded sheet passed through said machine;

flipping said folded sheet over after said folded sheet is discharged from said machine;

operatively positioning the flipped folded sheet in said paper input area against said alignment guide member;

operating said paper feed means to feed the flipped folded sheet through, and then discharge said sheet from, said machine; and operating said image transfer means to imprint a second portion of the stored oversized image upon said second outer side surface of the flipped folded sheet as the flipped folded sheet passes through said machine.

8. The method of claim 7 wherein:
said folding step is performed by folding said oversized sheet in half, and
said steps of operating said image transfer means are performed in a manner respectively imprinting first and second halves of the stored oversized image on said first and second outer side surfaces of said folded sheet.

9. The method of claim 7 wherein:
said positioning and flipping steps are manually performed by an operator of said machine.

10. The method of claim 7 wherein:
said machine has a maximum paper feed width, and
said folding step is performed in a manner configuring said folded sheet to have a width, transverse to the folded sheet feed direction through said machine, substantially equal to said maximum paper feed width.

11. The method of claim 10 wherein:
said folding step is performed by folding said oversized sheet in half.

12. The method of claim 7 wherein:
said normal sheet size is rectangular and has a length and a width,
said oversized sheet is rectangular and has a width which is equal to the length of said normal sheet, and a length which is equal to twice the width of said normal sheet, and
said folding step is performed by folding said oversized sheet in half lengthwise.

13. The method of claim 7 wherein:
said machine has a maximum printing width, and
said folding step is performed in a manner configuring said folded sheet to have a width, transverse to the folded sheet feed direction through said machine, substantially equal to said maximum printing width.

14. The method of claim 13 wherein:
said folding step is performed by folding said oversized sheet in half.

15. The method of claim 7 wherein:
said image reproduction machine is a laser printer, and
said step of storing said oversized image in said memory means includes transmitting to said laser printer a signal representative of said oversized image from a computer connected to said laser printer and in which a computer assisted drawing program is loaded.

* * * * *